United States Patent

Wine et al.

Patent Number: 6,137,834
Date of Patent: Oct. 24, 2000

[54] METHOD AND APPARATUS FOR SPLICING COMPRESSED INFORMATION STREAMS

[75] Inventors: Charles M. Wine, Princeton; Robert Norman Hurst, Jr., Hopewell; Christopher Ward, Glen Ridge; Paul Wallace Lyons, New Egypt, all of N.J.

[73] Assignee: Sarnoff Corporation, Princeton, N.J.

[21] Appl. No.: 08/864,322

[22] Filed: May 28, 1997

Related U.S. Application Data

[60] Provisional application No. 60/018,554, May 29, 1996.

[51] Int. Cl.$^7$ .................................................. H04B 1/66
[52] U.S. Cl. .................................................. 375/240
[58] Field of Search .................................. 375/240, 241, 375/242; 370/300, 342, 343, 349, 381–383, 389, 465, 468, 537, 538, 540

[56] References Cited

U.S. PATENT DOCUMENTS

| | | | |
|---|---|---|---|
| 5,138,440 | 8/1992 | Radice | 358/13 |
| 5,280,479 | 1/1994 | Mary | 370/85.6 |
| 5,365,272 | 11/1994 | Siracusa | 348/426 |
| 5,371,547 | 12/1994 | Siracusa et al. | 348/426 |
| 5,371,741 | 12/1994 | Entani | 370/112 |
| 5,479,398 | 12/1995 | Cyr | 370/56 |
| 5,509,013 | 4/1996 | Adachi et al. | 370/84 |
| 5,534,944 | 7/1996 | Egawa et al. | 348/584 |
| 5,548,532 | 8/1996 | Menand et al. | 364/514 C |
| 5,596,581 | 1/1997 | Saeijs et al. | 370/394 |
| 5,602,592 | 2/1997 | Mori et al. | 348/415 |

FOREIGN PATENT DOCUMENTS

| | | |
|---|---|---|
| 0 590 974 | 9/1993 | European Pat. Off. . |
| 7-212766 | 8/1995 | Japan . |

OTHER PUBLICATIONS

Weiss S M: "Switching Facilities in MPEG–2: Necessary But Not Sufficient" SMPTE Journal, vol. 104, No. 12, Dec. 1, 1995, pp. 788–802.

EP 0 757 492 A2 (Fujinami et al.) Feb. 5, 1997.

*Primary Examiner*—Don N. Vo
*Attorney, Agent, or Firm*—William J. Burke

[57] ABSTRACT

A method and apparatus for splicing a first compressed digital information stream into a second compressed digital information stream. The first information stream includes at least one entrance indicium identifying an appropriate stream entrance point, the second information stream includes at least one exit indicium identifying an appropriate stream exit point. A controller monitors the two streams until the appropriate points are found and, in response to a control signal, splices the first stream into the second stream.

13 Claims, 5 Drawing Sheets

METHOD AND APPARATUS FOR SPLICING COMPRESSED INFORMATION STREAMS

This application claims the benefit of U.S. Provisional Application No. 60/018,554, filed May 29, 1996.

This application is related to U.S. patent application Ser. No. 08/864,321 (Attorney Docket No. 12070), filed on the same date as the present application.

This invention was made with U.S. government support under contract number 70NANB5H1174. The U.S. Government has certain rights in this invention.

The invention relates to communication systems in general, and more particularly, the invention relates to a method and apparatus for synchronizing a plurality of compressed data streams to facilitate stream selection, splicing and other operations.

BACKGROUND OF THE DISCLOSURE

In several communications systems, the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172, incorporated herein by reference. The second, known as MPEG-2, refers to ISO/IEC standards 13818, incorporated herein by reference. A compressed digital video system is described in the Advanced Television Systems Committee (ATSC) digital television standard document A/53, incorporated herein by reference.

A program transport stream is formed by multiplexing individual elementary streams which share a common time base (i.e., the same 27 MHz clock source). The elementary streams comprise encoded video, audio or other bit streams. The elementary streams may be, but do not have to be, in a packetized elementary stream (PES) format prior to transport multiplexing. A PES consists of a packet header followed by a packet payload. As the elementary streams are multiplexed, they are formed into transport packets and a control bit stream that describes the program (also formed into transport packets) is added.

There are many instances where there is a need to switch from one encoded or compressed bitstream to another. When switching from one compressed MPEG video bitstream to another, appropriate measures must be taken in the transmission order of the picture bitstream to assure proper subsequent presentation of the decoded pictures, without time gaps. Such time gaps result in undesirable video or audio artifacts (e.g., blank screen due to buffer overflow/underflow, poor "lip sync" and the like). Heretofore there has not existed a seamless splicing method and apparatus for splicing transport streams to one another.

Therefore, a need exists in the art for a method and apparatus for splicing compressed digital information bitstreams.

SUMMARY OF THE INVENTION

The disadvantages heretofore associated with the prior art are overcome by the present invention of a method and apparatus for splicing compressed digital information streams. In particular, the invention splices a first information stream into a second information stream. The first information stream includes at least one entrance indicium that identifies an appropriate point of entrance to the stream. The second information stream includes at least one exit indicium that identifies an appropriate point of exit from the stream. The invention monitors the two streams until the appropriate points are found and, in response to a control signal, splices the first stream into the second stream.

Specifically, the inventive splicer includes a pre-splice buffer receiving a first information stream and producing a buffered information stream; a bitstream examiner receiving the first information stream and responsively causing the pre-splice buffer to position an entrance point of the buffered information stream at an output of the buffer; a switch for coupling either the buffered information stream or a second information stream to an output; and a switch controller for monitoring the second information stream and, in response to a control signal and the detection of an exit point in the second information stream, causing the switch to couple the buffered information stream to an output.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
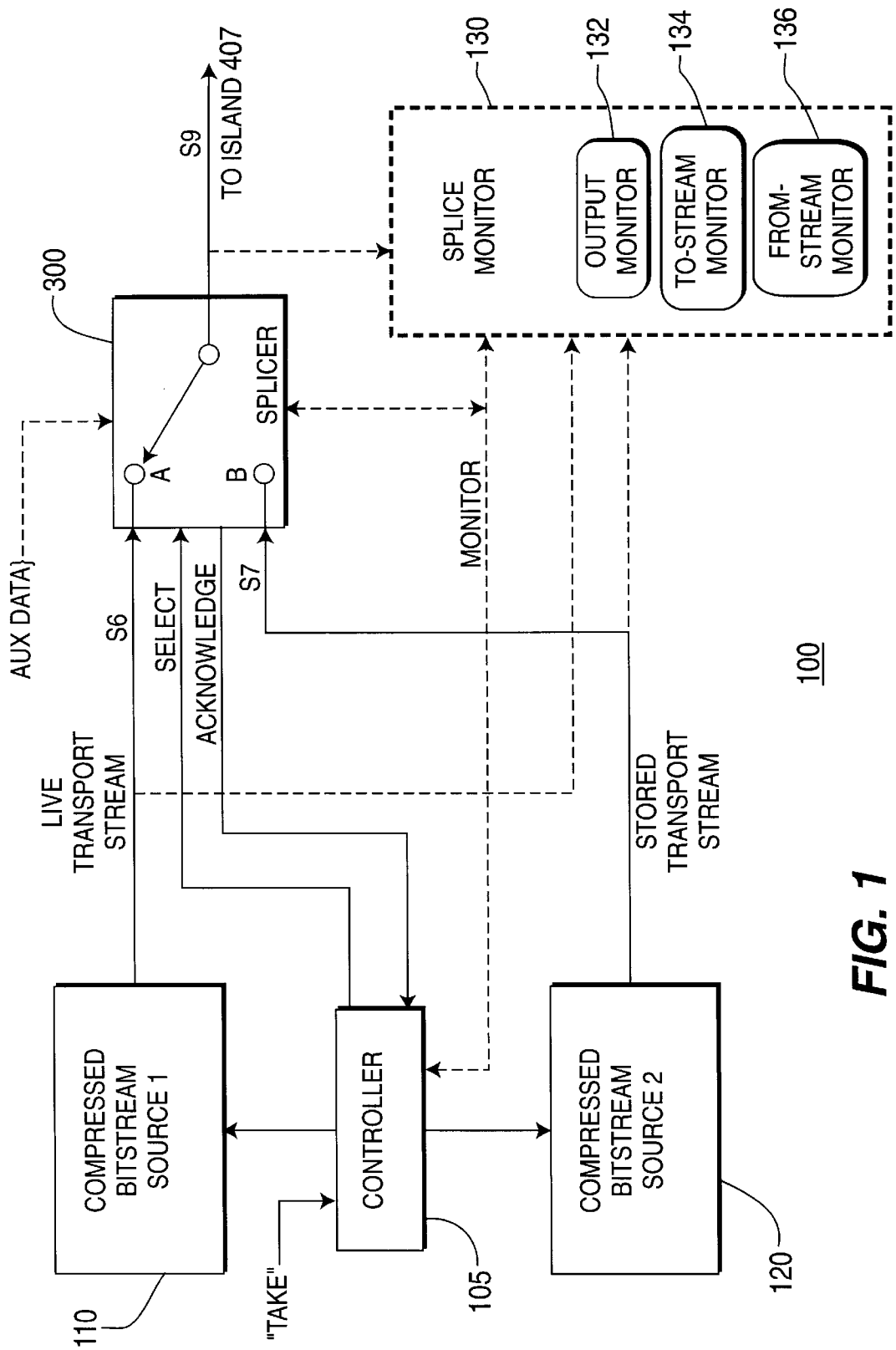
FIG. 1 shows a block diagram of a compressed bitstream splicing system including the invention.

The invention is generally described within the context of a digital television studio includes a plurality of operative environments which receive and process various bitstreams and which have associated switching capabilities according to the invention. The switching capabilities allow seamless or non-seamless splicing of a plurality of, e.g., video transport streams to produce an output stream. A combination of seamless and non-seamless bitstreams may be produced to provide a controllably degraded output stream.

The invention is a two-input bitstream splicer which performs switching, splicing or insertion operations on a pair of MPEG-compliant input transport streams to produce an output stream. It must be noted that the principles of the invention apply to bitstream switchers or splicers having more than two inputs and to input streams other than MPEG-compliant input streams. The invention may be implemented using a general purpose computer system that is programmed to perform the functions discussed below. As programmed, the general purpose computer becomes a specific purpose apparatus for splicing digital data bit streams.

The invention may be used for both seamless and non-seamless splicing of bitstreams. Seamless splicing means seamless butt-splicing of two streams to form a resultant output stream that produces a continuous, undisturbed flow of information (e.g., video or audio without glitches or artifacts). Non-seamless splicing produces a resultant output signal which may have a disturbed information flow (e.g., visual or aural distortions, disturbances and artifacts). For purposes of this discussion, it will be assumed that each bitstream is a transport stream comprising video, audio and (possibly) other information. It must be noted that the invention is applicable to packetized elementary and other elementary streams. Additionally, it is assumed that the splicing points are determined with respect to the video information. This may result in some distortions in the spliced audio and other information, since the audio and other information may not temporally "line up" on a packet by packet basis.

Splicing consists of making a transition in an output-stream from a "from-stream" to a "to-stream." The from-stream is ideally exited at an "out-point" and the to-stream is ideally entered at an "in-point." An out-point is a place in a presently-selected stream (i.e., "from-stream") where the stream may be ended, and some other stream (i.e., "to-stream") spliced on. An "in-point" is a place in the other stream where the information may begin to be spliced on to another stream.

A "splicing segment" is defined as the portion of an information stream between an in-point and an out-point. A splicing segment may include multiple out-points and in-points. Thus, it is desirable to include as many in-points and out-points as possible in a stream to allow for maximum flexibility in splicing. Within the definition of an in-point and an out-point is a delay-parameter, e.g., a video buffering verifier (VBV) for MPEG compliant streams. A splicing segment with a known in-point delay-parameter and with out-points having the same known delay-parameter may include within itself shorter valid splicing segments with different values of the delay-parameter.

In the context of a studio environment of an exemplary embodiment of the invention, information streams are divided into transport packets. Packets containing video may be intermixed with packets containing audio, auxiliary data, or other information. In this environment, a video stream out-point is the end of the last video transport packet of the stream of interest. The video stream before and through the last packet must meet the splicing definition of an out-point. Similarly, a video stream in-point is the beginning of the first video transport packet of a splice segment (SS). It must be noted that other information in the transport stream, specifically audio, is unlikely to be neatly segmented at in-points and out-points. A method for correcting errors induced by the non-alignment of audio transport packets is described in U.S. patent application Ser. No. 08/864,321, filed simultaneously herewith (Attorney Docket 12070), incorporated herein by reference.

A critical aspect of splicing information streams is the proper processing of the various delay parameters. One parameter of concern is the delay parameter associated with the various information streams. In the case of an MPEG-compliant stream, the delay parameter is the video buffering verifier (VBV) delay parameter. Another parameter is the latency, or transitional period, inherent in a splicing operation. For example, a typical splice occurs at a certain time, i.e., a "splice time." Prior to the splice time an output information stream comprises a from-stream. At the splice time, a switch to the to-stream occurs. For a period of time the output stream may include information from both the from-stream and the to-stream. Eventually the output stream includes information from only the to-stream.

It is assumed that the from-stream and the to-stream are each valid. There are certain constraints on the streams that must be met if the splicing is to be seamless. Seamless splicing implies that the resultant spliced bitstream will not cause discontinuities in the future.

One specific example of a valid splice segment that can be seamlessly spliced is an MPEG-compliant splice segment. An MPEG Splice Segment (SS) is defined at the transport level and includes functionality at the video (and audio) levels. An information-bearing splice segment may be as short as a single frame. A splice segment may even be a zero frame length segment (although such a SS might be MPEG non-compliant). Such a zero-length segment is simply an in-point followed by an out-point (i.e., an "in-out-point"). A SS may be also be very long, including many GOPs. In general the length of a SS is not constrained and the SS should include multiple out-points to enable seamless exiting from the segment. A possible exception is a SS comprising a television commercial. The television commercial SS can be deliberately produced without defined out-points so that exiting the commercial segment is not seamless.

An MPEG SS should be an MPEG compliant stream having consistent transport stream and elementary stream time stamps (e.g., PCR, PTS and DTS) and an associated delay parameter (e.g., a VBV delay), thereby allowing a decoder to properly decode and present the information in the SS. The first information frame (e.g., video access unit) at an in-point of an MPEG video SS must be an I-Frame. The second frame shall not reference information frames prior to the in-point (i.e., if the second frame is a B-frame, the B-frame may not reference frames prior to the in-point). The last frame before an out-point should not be a B-frame (in display order). An audio SS will have an in-point consisting of the beginning of an audio frame and an out-point consisting of the last byte of an audio frame. There may be other constraints placed on the stream to address issues of, e.g., coding error-build-up, tuning-time and minimum picture quality.

The in-point of a video SS must begin with a sequence header, although the SS may contain multiple sequence headers. A SS may contain additional header information to indicate that the sequence header is also an in-point. It is necessary to distinguish the SS in-point sequence header from a sequence header included for tuning-time or picture quality, since seamless splicing can only be guaranteed on in-points. Since the in-point should follow an sequence end code (SEC) code it is desirable to include the SEC code just before the in-point, thereby obviating the need to include the SEC on the end of an out-point. The out-point may include the SEC. An MPEG-type splice count-down, if used, must end (i.e., equal zero) at the out-point.

FIG. 1 shows a block diagram of a compressed bitstream splicing system 100 including the invention. The system 100 includes a first compressed bitstream stream source 110, a second compressed bitstream stream source 120, a splicer 300, a controller 105 and an optional splice monitor 130. The first compressed bitstream stream source 110, illustratively a "live feed" from a transport stream encoder, produces a first MPEG-compliant transport stream S6. The second compressed bitstream stream source 120, illustratively a server (e.g., a video disk, tape machine, or other storage device) which stores video and audio elementary streams and transport encodes the stored streams to produce a second MPEG-compliant transport stream S7. The stored information may comprise, e.g., advertisement or local programming information to be spliced into the first transport stream. The splicer 300 selectively couples one of the two input transport streams S6, S7 to a transmitter or other subsystem as an output stream S9. An optional splice monitor 130 monitors various parameters of the spliced output signal S9, e.g., delay parameter, buffer utilization information, synchronization, bitstream source and the like.

The optional splice monitor 130 is responsive to the controller 105 and the splicer 300.

The splicer 300 receives the first transport stream S6, illustratively a television program produced by a first source, and the second transport stream S7, illustratively an advertisement produced by a second source. In response to a control signal SELECT, the splicer produces an output signal S9 comprising either the first S6 or second S7 transport stream. The control signal SELECT may include priority information which causes the splicer 300 to respond immediately, within a defined time interval or when certain conditions exist (i.e., specific alignments of stream entrance or exit points). The splicer 300 produces a signal ACKNOWLEDGE which is used to acknowledge the SELECT signal and provide specific details about the splice operation (e.g., exact time of splice, error conditions and the like). The operation of the splicer 300 is described more fully below with respect to FIG. 3.

The actual splicing operation is the process that takes place within the splicer 300 that does what is necessary to actually switch amongst the bitstreams. This involves stopping, in an orderly manner, the flow of packets from the from-stream; starting, in an orderly manner, the flow of packets from the to-stream; and adjusting the header information in the output stream. During some interval, packets from both the from-stream and the to-stream are likely to be intermixed.

Splicing operations must be synchronized to be seamless. To ensure that input streams arrive at the appropriate splicers at the time they are needed several synchronizing operations may be performed. It is assumed that the output stream is continuous and that the actual splice is taken to be a change in the content of the output stream from a from-stream to a to-stream. The time stamps in the output stream should also maintain continuity from one stamp to the next (this is related to stream content) and the splicing mechanism should adjust the output stream time-stamps. In the absence of time stamp continuity in an MPEG system, the MPEG "discontinuity" header flag should utilized such that an indication of a new time stamps (or time stamp discontinuity) is provided to a decoder.

To accomplish the adjustment the splicing process must have some notion of time, since this local notion of time that must be used to produce the output time-stamps. The splicing process gets its notion of time from some timing source such as the OC-12c interface and the current time is derived from either stream content or set-time messages. The local notion of time must be moderately continuous and well behaved. When splicing, both the end of the from-stream and the beginning of the to-stream must be available at the actual splice hardware that is producing the output. In addition, all buffering within the splicing process must be finite and defined.

In addition to the above issues, there are synchronization issues to be considered. For example, it is important to consider the effect of packet jitter on the splicing process. If any additional information is required, beyond that contained within the actual streams being spliced (e.g. priority information, source identification, error codes and the like), the additional information must be properly synchronized with the actual splice streams.

There are several conditions that are of interest with respect to synchronization of the splicing function. These are the timing relationships between desired operation and actual operation, continuous-flow streams, server-generated streams and remotely-generated streams.

The timing relationships between desired operation and actual operation will be discussed first. At some operational unit, e.g. a Play-to-Air Switcher, a decision to switch streams must be made. The source of an output stream is actually switched in response to that decision.

The decision to splice may be content related, such as a switch from a from-stream to a to-stream when a content-related data element is encountered in one of the streams. For example, the from-stream may be monitored and, in response to the detection of, e.g., a black-screen or a scene change, a splice decision may be made. This operational decision does not require synchronization. Rather, the decision requires that the splicer (or a controller) analyze, e.g., the from-stream to detect the data element. The decision to splice may also be data-flow related, such as a switch from a from-stream to a to-stream on some particular packet or upon the start or stop of information flow.

The decision to splice may be time-related, such as a switch from a program to commercial at noon. Time-related decisions must be referenced to the splicer's local frame-of-reference. A message-passing process passes the decision information to the splicer in time for the splicer to be ready to make the splice in its frame-of-reference. Given that the decision to splice at some time has been made, the splice will be made at the next available splice point, based upon the from-stream and the to-stream.

The decision to splice may be may be event driven, such as the pushing of a button (e.g., the director's "take" command, as depicted in the splicer 100 of FIG. 1). When the message indicating the event arrives at the splicer, the actions are the same as those for a time-related decision whose time has arrived.

Some form of acknowledge message may be required. This message, when delivered to the originator of the splice decision (e.g., the controller), will allow an intelligent choice to be made about time-outs, and actions like panic non-seamless splices. Time-outs and determinations about corrective actions to remedy splice failures is a policy matter for the originator of the splice decision. Time-out and forced switch may be a service implemented by the splicer but only as a convenience.

An operational unit (e.g., splicer or switcher) may feed back an appropriate acknowledgment message to a controlling entity. The contents of such a feedback message may include one or more of the following parameters: 1) a splice did or did not take place; 2) the local time-of-day that the splice occurred; 3) the delay-parameter value of the to-stream; 4) the delay-parameter value of the from-stream; 5) the current (post-splice) sync-buffer delay (e.g., in delay seconds); 6) the future time a splice will take place (if the switcher can compute this value); and 7) any exceptions or errors. Exceptions and errors may include the fact that no splice took place, that the decision parameters passed by the controller were incorrect (e.g., syntactically or logically), that the to-stream was not ready, that a time-out occurred or that an audio-failure occurred (e.g., the dropping of an excessive number of audio frames).

Additional information that may be of value includes: 1) the amount of time that the audio information from the from-stream will be needed; 2) an indication that the inputs are buffered correctly and ready for a new splice; and 3) other information useful to the controller or the splicing process itself.

The precise time at which a seamless splice takes place may not be pre-determined, since the seamless splice depends upon the arrival of an in-point in the to-stream. In the case of a decision to splice seamlessly there are several sub-decisions which must be made about what to do if the splice does not take place within some time limit. The choices are as follows. First, simply wait for a seamless splice to occur. Depending upon studio operational goals, this may not be acceptable. Second, define a fixed time-out period and, if the splicer has not spliced within the defined time-out period, perform a non-seamless splice (i.e., switch streams in as controllable a manner as possible). While this is a simple approach, it limits decision flexibility. Third, simply wait for the splice to occur but acknowledge this condition to the controlling entity. Whatever process generated the splice decision may then decide to allow a non-seamless splice. This allows reasonable operational flexibility. Fourth, provide a programmable time-out, optionally including a default time-out and optionally including an acknowledgment of this condition to the controlling entity. This option allows the controlling entity to alter the time-out value, thereby providing the greatest operational flexibility. It should be noted that a time-out is a secondary operational feature and, therefore, an exception to normal operation.

The synchronization of continuous-flow stream splicing will now be discussed. The streams arrive and must be buffered (e.g., one second's worth of information) within the splicer in some manner so that, e.g., to-stream in-points are available when out-points occur in the from-stream. If the amount buffered is insufficient (e.g., more than a second elapses between successive in-points in a from-stream), then the buffer will overflow and will contain invalid information. This condition is remedied by an appropriate number of in-points and out-points being inserted into the bitstreams. If bitstreams do not have in-points and out-points often enough, then those bitstreams can not be seamlessly spliced at those times. Moreover, to the extent that there is packet or cell jitter in the arrival time of input bitstreams, a first-in, first-out (FIFO) buffer (with output clocked at nominal data rate) is expected to smooth the flow.

The synchronization of server generated streams will now be discussed. Server-generated streams must be carefully generated so that the data does not arrive at the splicer too early or too late. If the data arrives too early, there is some risk of overflow of an input buffer. If it is assumed that the splicer has enough synchronization buffering to hold a second or so of video, then it would seem that server streams can be delivered in any pattern of flow that never exceeds the just-in-time limit, and the one-second-early limit. Of course, there may be peak rate imitations on the splicer.

The synchronization of remotely-generated streams will now be discussed. It must be noted that any stream processed in a studio containing the splicer is expected to have the same reference clock rate. Remotely-generated streams, by the time they have reached a splicer, should be the same as locally-generated real-time streams. To reference remotely-generated streams to a local master clock the remote source may be genlocked to the local studio. This can be done via a reverse channel or by locking both to an external reference, such as a timing signal derived form the Global Positioning System (GPS). If there are two independent studios, each with an independent master clock, and each is doing a remote feed to the other, then one will be delivering data too slow for the other, and one will be delivering data too fast. Another method is to delay a remote feed by a time equal to the maximum clock drift over some operating interval. A 30 ppm. drift rate, over 24 hours, accumulates 2.6 seconds. A six second buffer, initialized to a 3 second fill, is adequate to absorb clock drift.

Splice monitoring is an important aspect of splicing, especially in a studio environment. Content-related monitoring may comprise the steps of viewing an image on a display device (i.e., "monitor") responsively changing parameters of the bitstreams producing the image (e.g., splicing). Optional splice monitor 130 may be used for content-related monitoring by, e.g., a director. Another form of monitoring is the qualitative assessment of a monitored bitstream. Optional splice monitor 130 may be used to retrieve qualitative information from the spliced output signal S9, e.g., delay parameter, buffer utilization information, synchronization information, bitstream source identification and the like. The optional splice monitor 130 is responsive to the controller 105 and the splicer 300 to either process the information and return, e.g., an operational summary, or to couple the qualitative information directly to the controller 105 and the splicer 300 for further processing.

With respect to content-based monitoring, a director (i.e., human) may be viewing the various bitstreams via monitors (i.e., decoders driving displays) and responsively splicing to produced an output stream (i.e., a program). This issue is especially significant in production or live switching with complex-GOP streams. The problems are greatly minimized if operating in a low-delay (e.g., I-frame only) production mode. When the director indicates that a splice is to be made "now," that decision is likely to be based upon what the director sees and expects to see. As a decoder inherently presents its picture after some delay from its input bitstream (e.g., part or all of end-to-end delay and some additional decode and format delay), the modes of operation for the director in an MPEG studio environment will be different from current NTSC-related operations. For purposes of the following examples, assume that a director is operating in an MPEG studio environment, that splice segments are ¼ second long, and that the end-to-end delay of the spliced stream is ½ second.

A first example is a "soonest" mode of operation. In this mode, the director presses a "take" button TAKE based upon an event seen on an output monitor 132, a from-stream monitor 136 or a to-stream monitor 134. A queued up (e.g., server-stored) to-stream is ready and aligned at an in-point. Within ¼ second of the splice command an out-point will arrive at end of the from-stream sync-buffer and the splice will be made. It must be noted that the from-stream contains up to ¼ second of delay. One monitor delay later (½ second) the scene on the output monitor changes.

If the director responded to a scene on the output monitor 132, the amount of output monitor delay (i.e., the time between the "take" command TAKE and a change in scene on the output monitor 132) is between ½ and one second. If the director responded to a scene on the from-stream monitor 136, the amount of from-stream monitor delay is between ¼ and ½ second and the output monitor delay is ½ second. If the director responded to a scene on the to-stream monitor 134, the to-stream monitor 134 is continuous (i.e., no monitor delay) and the output monitor delay is negative ¼ seconds (i.e., the scene changes ¼ second after the "take" button TAKE is pressed and the image displayed occurred ¼ second prior to the press of the button).

A second example is the "next" mode of operation. In this mode, a queued up to-stream is flushed from a to-stream synchronization buffer and the next segment beginning with an in-point is queued up within up to ¼ second. The to-stream synchronization buffer also has zero to ¼ seconds of random delay. When the in-point arrives the splice is made.

If the director responded to a scene on the output monitor 132, the amount of output monitor delay is between ½ and one second. If the director responded to a scene on the from-stream monitor 136, the amount of from-stream monitor delay is between ½ and ¾ second and the output monitor delay is ½ second. If the director responded to a scene on the to-stream monitor 134, the to-stream monitor 134 is continuous and the output monitor 132 switches to a new scene between zero and ¼ second later.

The choice of "soonest" or "next" mode of splicing is an operational one, and may be based upon which disconcerting effect (delay or back-up) is least objectionable. To alleviate these effects an amount of delay may be inserted into the splicer inputs. If this delay matches the monitor delay, and the monitors are connected to the inputs of the delays, then the apparent delay between monitor scenes and button action is less, but the delay to final output is greater. In addition, a separate monitor control unit may be built to simulate the bit-stream switching and show the simulated results of the bitstream switch, thereby providing more flexibility to the director.

Figure 3:
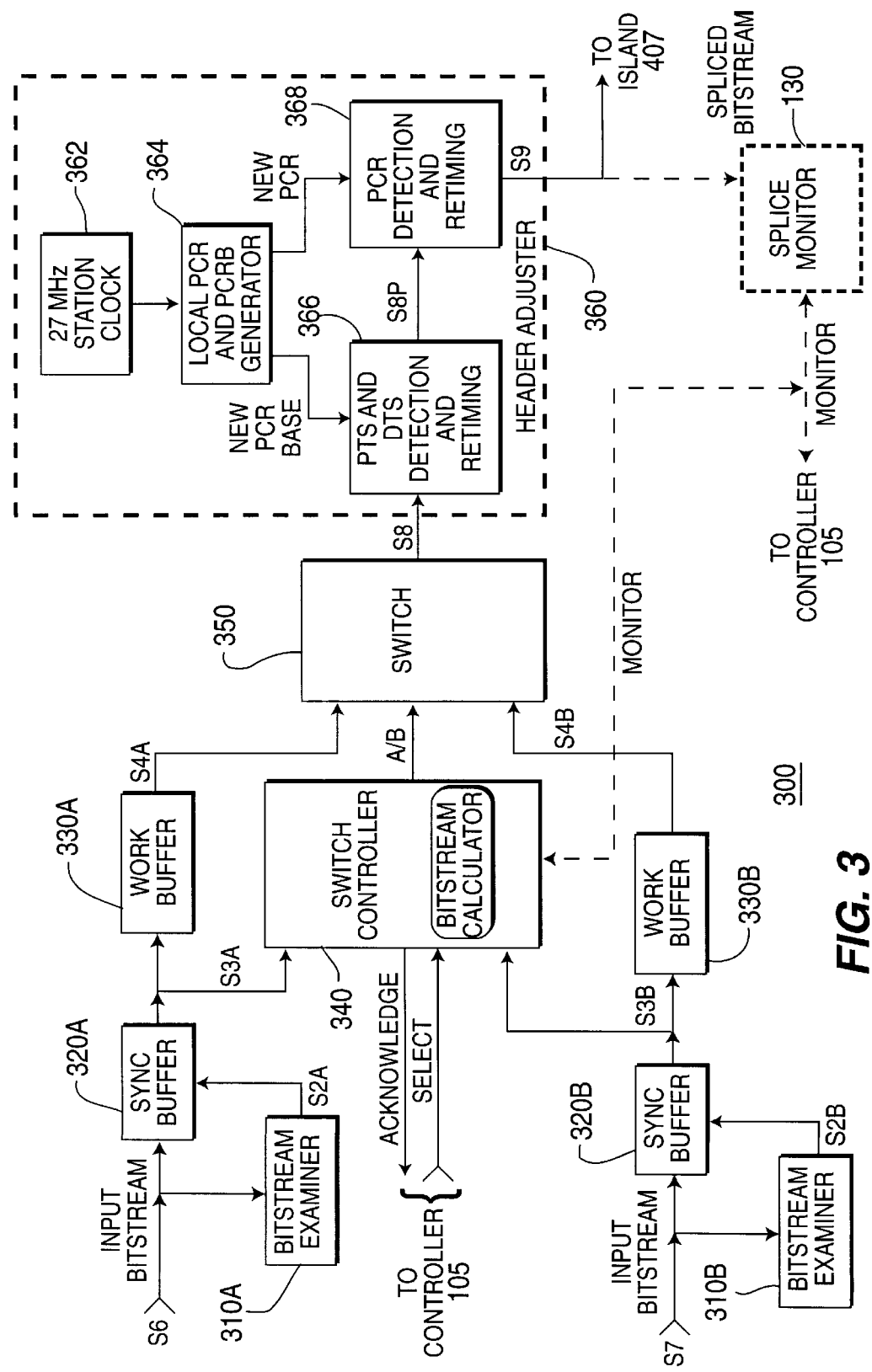
FIG. 3 shows a detailed block diagram of the splicer of FIG. 1.

FIG. 3. shows a detailed block diagram of the splicer 300 of FIG. 1. The splicer 300 selects one of a first input bitstream 86 and a second input bitstream 87 as an output bitstream S8. The output bitstream 88 is optionally time stamped to produce a retimed output stream S9. The first and second input bitstreams S6, 87 are, illustratively, MPEG-compliant transport streams including at least video and audio elementary streams. The video and audio elementary streams may be in a packetized elementary stream (PES) format.

For purposes of the following discussion it is assumed that the second bitstream S7 is currently selected as the output bitstream (i.e., S7 is the from-stream) and the first bitstream S6 will be selected as the output bitstream (i.e., S6 is the to-stream) after a splicing operation.

The first input bitstream S6 is coupled to a first bitstream examiner 310A and a first synchronization buffer 320A. The first bitstream examiner 310A examines the first bitstream for entrance points which have been included in the first input bitstream S6. When an in-point is found, the contents of the synchronization buffer are discarded (i.e., the buffer is "flushed") and the in-point is stored in the first memory portion of the synchronization buffer. The synchronization buffer may be constructed as a first-in, first-out (FIFO) buffer. The process of searching for in-points and flushing the buffer is repeated until the first input bitstream S6 is selected by the splicer. In this manner, there is always an in-point positioned at the end of the synchronization buffer of the stream that is not being currently output. The output bitstream S3A of the first synchronization buffer 320A is coupled to a switch controller 340 and a first working buffer 330A. The first working buffer 330A produces an output signal S4A which is coupled to a packet switching unit 350.

The second input bitstream S7 is coupled to a second bitstream examiner 310B and a second synchronization buffer 320B. If the second bitstream were not presently selected as the output stream, then the second bitstream examiner 310B and synchronization buffer 320B would operate in the same manner as described above with respect to the first bitstream examiner 310A and synchronization buffer 320A. The second bitstream examiner 310A examines the second bitstream for exit points which have been included in the second input bitstream S6. In the "selected mode" of operation, the second bitstream examiner 310B is not used and the second synchronization buffer 320B serves as a constant delay buffer which produces a delayed bitstream S3B.

The delayed bitstream S3B is coupled to a working buffer 330B and a switch controller 340. The second working buffer 330B produces an output signal S4B which is coupled to packet switching unit 350. The second working buffer 330B holds the selected bitstream long enough to allow for overlap of old audio packets with current video packets. This allows audio frames to continue to completion after a splice is made. The synchronization of audio and video frames are discussed in more detail below and in U.S. patent application Ser. No. 08/864,321, filed simultaneously herewith (Attorney Docket 12070) and incorporated herein by reference.

A splice decision is made by a controller (e.g., controller 105) and coupled to the switch controller 340 via a control signal SELECT. Assuming that the splice decision equates to the command "splice seamlessly at the next opportunity," the switch controller 340 responds by scanning the currently selected output stream (i.e., bitstream S3B) for out-points. It is assumed that an in-point is positioned at the end of the first synchronization buffer 320A. When an out-point arrives on the from-stream, the switch controller 340 causes, via a control signal A/B, the switch 350 to begin coupling video packets from the to-stream through the switch to an optional header adjuster. At an appropriate time any audio packets within the to-stream are also switched.

The optional header adjuster 360 alters time-stamps in the selected output stream S8 to produce a retimed output stream S9. The retiming of the program clock reference (PCR), presentation time stamps (PTS) and decode time stamps (DTS) of the selected stream S8 may be necessary to ensure that the splice is, in fact, seamless to a decoder. The header adjuster 360 includes a 27 MHz (local) station clock 362 which is utilized by a local PCR and PCRB generator 364. To retime the presentation and decode time stamps it is necessary to partially decode (i.e., packetized elementary stream (PES) layer) the selected transport stream S8. The partial decoding and retiming of the PTS and DTS is performed by a PTS and DTS detection and retiming unit 366 to produce a PTS and DTS retimed stream S8P. The PTS and DTS retimed stream is transport encoded and time stamped by PCR detection and retiming unit 368 to produce a retimed transport stream S9. An alternate embodiment of a header adjuster is the PTS-DTS retimer discussed in more detail in U.S. patent application Ser. No. 08/864,326, filed simultaneously herewith (Attorney Docket 12389) and incorporated herein by reference.

As previously mentioned, the invention may be implemented using a general purpose computer system that is programmed to perform the various functions. The embodiment of FIG. 3 may be implemented as a computer program utilizing portions of memory to provide buffering, and an algorithm directed to the examination, control, switching and header adjustment functions. As previously mentioned, the splicer 300 produces a signal ACKNOWLEDGE which is used to acknowledge the SELECT signal and provide specific details about the splice operation (e.g., exact time of splice, error conditions and the like). A routine for splicing will now be described with respect to FIG. 2.

Figure 2:
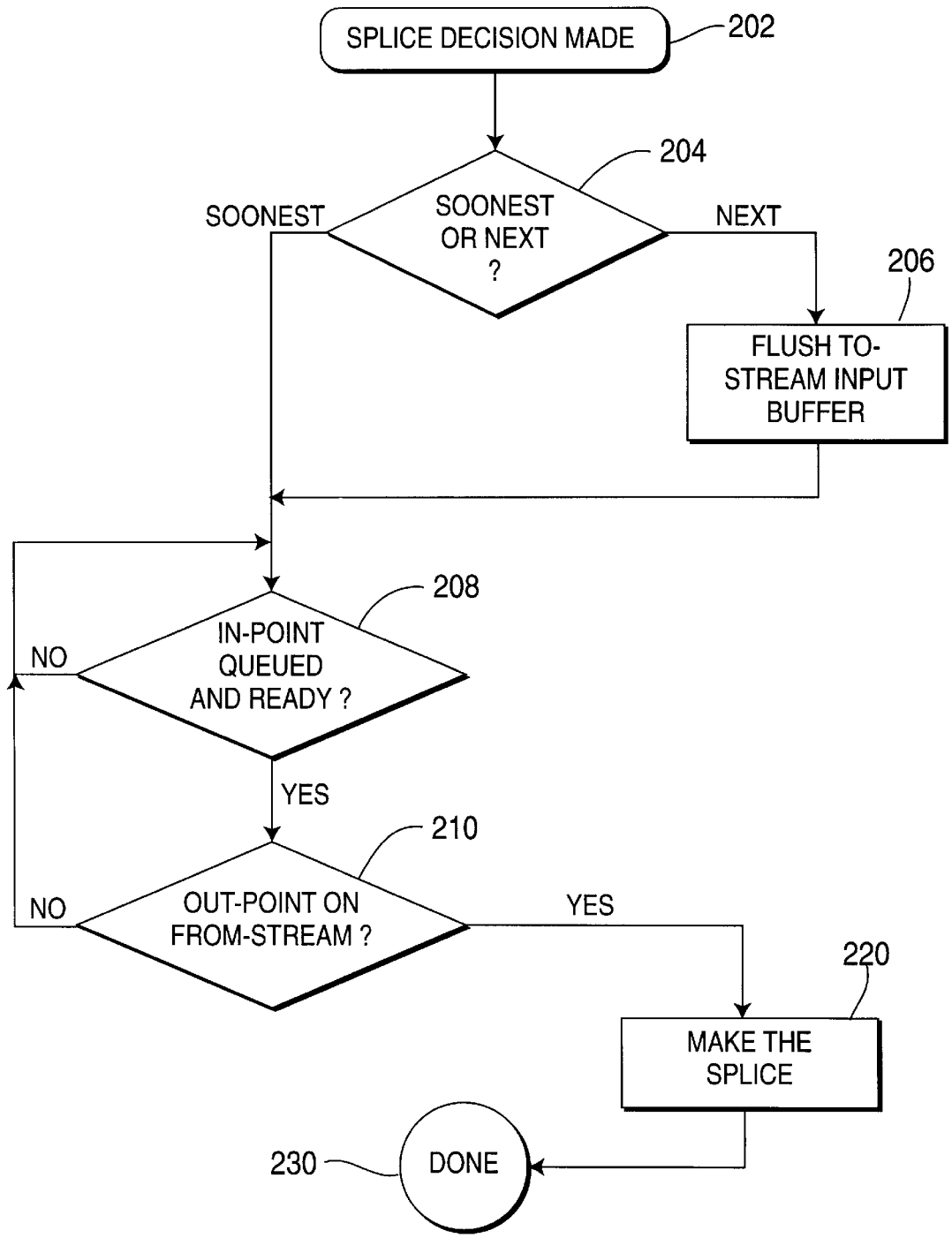
FIG. 2 depicts a flow chart of a seamless splicing process in accordance with the invention.

FIG. 2 illustrates a splicing routine in accordance with the invention. The splicing routine is entered at step 202 when the decision to splice is made. For the purpose of this discussion, it is assumed that the decision is to seamlessly splice from the currently selected (from) stream S4B to another (to-stream) stream S4A. The decision is examined at step 204. If the decision of step 202 is to splice as soon as possible, then the routine proceeds to step 208. If the decision is to splice at the next in-point (e.g., skip the presently buffered GOP in the to-stream), then the synchronization buffer (e.g., 320A) is flushed. When the to-stream synchronization buffer (e.g., 320A) has a valid in-point stored (step 208) and the from-stream is at a valid out-point (step 210), the splice is made (step 220) and the routine is exited (step 230). The context in which a splicing decision (step 202) is made is relevant to the amount of information necessary to perform a seamless splice. If the splice decision is made in the context of building play-to-air edit lists, it is necessary for the streams to be spliced to have the same value of delay-parameter. If the splice decision is made in the context of creating a live production, it is necessary for the streams being spliced to have matching delay-parameters and splice points which occur often enough to meet operational requirements. If the splice decision is made in the context of creating a live production, and the production involves information stored on servers, it is helpful to know that anticipated splice-points are about to arrive soon (via, e.g., splice point countdowns or splicing tables). The splicing decision and related matters will be discussed in detail below.

The invention will now be described within the context of a digital television studio including a number of distinct operating environments (such as servers or edit-suites) which receive, process and transmit various information streams. The operating environments, or "islands of interoperability," may be interconnected to perform one or more operations on the various information streams. The studio output may be delivered to end-users (e.g., the public) via ATSC broadcast, cable, telephone and satellite transmission and the like. The studio output may also be stored for later use in, e.g., a server or on CD-ROM or video tape. The invention is also useful in video teleconferencing and other applications.

While the streams delivered to broadcast customers must meet, e.g., ATSC standards, it is not necessary to deliver all of the internal studio information. For example, high bit-rate studio formats are useful only within the studio or studio-like environments. When dealing with splicing, there may be information within the stream that is meaningless to consumer decoders, but which is necessary to studio splicing.

Figure 4:
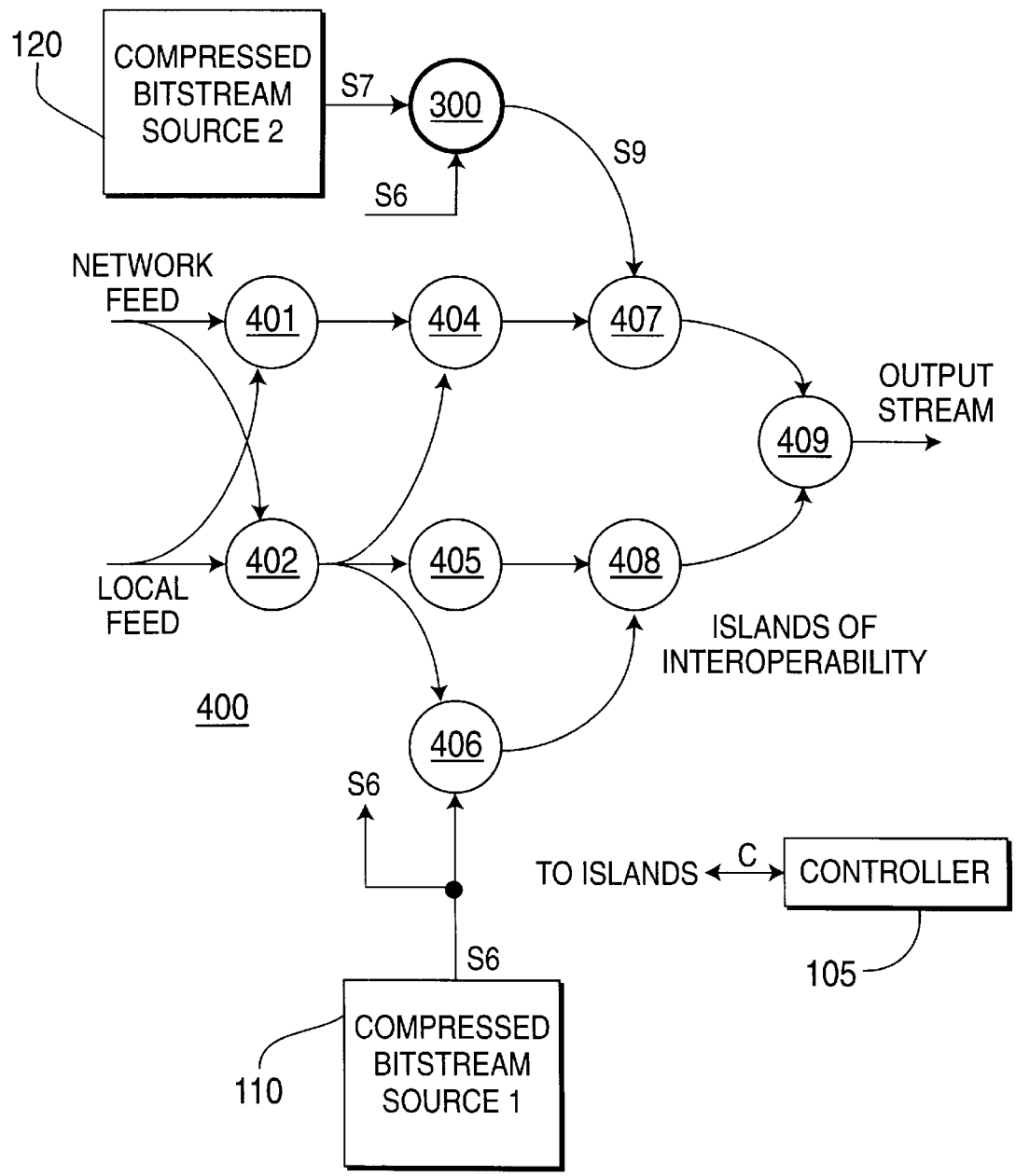
FIG. 4 depicts a block diagram of digital studio comprising a plurality of interoperable islands and including the invention.

FIG. 4 depicts a block diagram of digital studio comprising a plurality of interoperable islands and including the invention. The digital studio 400 of FIG. 4 includes interoperable islands 401, 402 and 404–409. The digital studio 400 also includes a first compressed bitstream stream source 110, a second compressed bitstream stream source 120, a splicer 300, a controller 105 and an optional splice monitoring unit. The first compressed bitstream stream source 110, illustratively a "live feed" from a transport stream encoder, produces a first MPEG-compliant transport stream S6. The second compressed bitstream stream source 120, illustratively a server (e.g., a video disk, tape machine, or other storage device) which stores video and audio elementary streams and transport encodes the stores streams to produce a second MPEG-compliant transport stream S7. The first and second compressed bitstream sources 110, 120 operate in substantially the same manner as previously described with respect to the bitstream splicing system 100 of FIG. 1. The digital studio 400 includes a controller 105 which performs those functions previously described with respect to the bitstream splicing system 100 of FIG. 1, and other functions which will be described below. Island 300 roughly equates to the splicer 300 of the bitstream splicing system 100 of FIG. 1.

Each of the islands receives a plurality of information streams. For example, islands 401 and 402 each receive information streams from a NETWORK FEED and a LOCAL FEED. Controller 105 communicates with each of the islands via a control channel C. The control channel C is used to direct the flow of information throughout the studio (i.e., between islands) and to direct the processing of the information within the islands. The controller 105 provides the splicing decisions and any necessary parameters associated with the intended splice. The islands respond by performing, monitoring and acknowledging (via control channel C) the various splicing operations.

A digital studio according to the invention may be described as an interconnected group of "splicing islands" which perform particular processing functions on received bitstreams to produce output bitstreams. This is because the islands form individually distinct operating environments (e.g., storage environments, editing environments, processing environments and the like) which cooperate with each other via a controller 105 to produce one or more output bitstreams (e.g., S9, OUTPUT STREAM). Each island operates at a known delay-parameter value and all splicing within an island is (ideally) seamless. The splicing and processing functions are under the general control of controller 105, but may be locally controlled as necessary. For example, an operator sitting at an editing station may logically comprise one island. The streams to be edited are routed to an editing island (e.g., island 407) in response to commands transmitted via control channel C from controller 105. In response to the commands a signal may be switched through several islands (e.g., 406 and 300) prior to being stored in a storage unit (not shown) at the editing island (e.g., 407).

An alternate mode of studio operation is to controllably operate one or more islands in a non-seamless mode. The non-seamless mode may be required in several circumstances where a splice or other transition between bitstreams must occur rapidly, and a range of bitstream degradation is permissible. It must be noted that non-seamless switching may produce errors which are propagated to subsequent islands receiving a degraded bitstream. These errors may be mitigated, if necessary, by, e.g., dropping damaged or inferior access units or groups of access units (e.g., video frames) or by adding additional access units. For example, if a to-stream having a short delay-parameter is to be spliced onto a from-stream with a long delay-parameter, the splicing operation is unlikely to be seamless (i.e., the buffer will likely overflow). In this case, frames may be dropped to avoid the overflow condition. Also, when a to-stream with a long delay-parameter is to be spliced onto a from-stream with a short delay-parameter, the splicer needs to adjust time stamps to cause a number of frame repeats (i.e., add frames) while the buffer fills. The buffer may also be increased by splicing short, all-black frames on the end of a short delay-parameter sequence to build up the value of the delay-parameter in current use.

In the exemplary embodiments of FIGS. 1, 3 and 4, splicing operations take place in operational units (e.g., splicing islands), such as routing switchers, play-to-air switchers, production switchers or other switchers. Therefore, it is desirable to support a plurality of data formats and bitrates. For example, the so-called 422@HIGH and 420@HIGH television studio formats each support multiple picture formats and bit rates. Therefore, it may be necessary to splice, e.g., a bitstream comprising a 1280 by 960 picture element, 60 Hz Progressive Scan picture onto the end of a bitstream comprising a 1920 by 1080 picture element, 59.94 Hz interlaced picture. Moreover, it may also be necessary to splice a 45 Mb/s stream onto the end of a 155 Mb/s stream.

Both of the above example splices may be seamlessly made if the streams being spliced have matching delay parameters. Therefore, it is important that the controller that makes the splice decision know the delay parameters of the various streams to be spliced. The delay parameter of a stream may be calculated by an operational unit receiving a stream or included within the stream as part of the stream's header information. In the splicer 300 of FIG. 3, switch controller 340 includes a bitstream calculator which calculates the delay parameters of the input streams S6, S7. Is should be noted that the delay parameter calculation may also be performed by the bitstream examiners 310A, 310B or the optional splice monitor 130.

Another critical aspect of splicing information streams is the determination of in-point and out-point locations in the streams to be spliced. To properly perform a seamless splice it is necessary to find the in-point of the to-stream and the out-point of the from-stream. Moreover, a splice segment may include in-points and out-points having different delay-parameter values. There are several options available for finding the appropriate splice points.

First, the entire to-stream or from-stream may be analyzed by the splicer in real time (i.e., "on the fly"). A real-time analysis is difficult for a to-stream because an in-point cannot readily be deduced from the stream without playing the stream to its end. Even if it were known that the stream is well-behaved, the length of an I-frame is not known in advance. By the time the first I-frame has ended, and its length is known, it is probably too late for the information to be used. It must be noted that this problem may be overcome by using, e.g., a more powerful computing device. A real-time analysis is easier for a from-stream because the delay-parameter of the from-stream is known (from the in-point or otherwise), the presentation time-stamps in the stream indicate when frames leave the decode buffer, and bit-counts (or packet counts) indicate when the frames enter the decode buffer. The frame rate is also known from sequence headers. With the foregoing information it becomes possible to calculate, at the start of a new frame, that the preceding video has left the buffer in an out-point status. This information arrives only a little bit late.

Second, an external table may be created to contain indications of where splice points are. This approach assumes that the information about in-point and out-point locations has been computed elsewhere (e.g., during a stream encoding process). This approach requires that the in-points and out-points be indexed in some manner (e.g., Nth packet from a marker, first packet after a time-of-day reference, and the like). This approach also requires the updating of a splice table associated with an information stream as the information stream is processed, and the transmission or regeneration of the table as the information stream is transmitted (e.g., via satellite link). It should be noted that the use of separate information tables to determine splice locations is practical within a server or island of operability, though this use of tables may be less practical when transmission encoding and decoding are to be performed on the stream.

Third, in-point and out-point markers may be placed within the information stream directly. An MPEG compliant information stream includes header portions where such a marker may be included. There are header portions suitable for in-point and out-point marker insertion at the system level, transport level and PES level. There are also opportunities to insert markers in the elementary streams.

Both in-points and out-point should be marked and, ideally, the marking should occur at the system, transport and PES levels. In addition to the insertion of in-point and out-point markers, the delay-parameter associated with the stream or splicing segment and an audio offset (i.e., a displacement of audio-frame boundaries from associated video frames) should also be inserted into one or more layers of the information stream. The MPEG count-down feature should also be used to indicate that, e.g., an out-point is approaching (decreasingly positive countdown) or an in-point has been transmitted (increasingly negative-countdown). For various business reasons it may be desirable to remove these markers prior to transmitting an MPEG or ATSC signal to an end-user (i.e., consumer). While end-users might want to splice the video, it is important that they not be able to clip out commercials automatically.

The above-described redundancy of marking provides a maximum flexibility to system designers and provides a redundancy of operation which helps to ensure that splicing operations are, in fact, seamlessly made (i.e., made at appropriate in-points and out-points).

Bitstream Generation

To help ensure seamless splicing it may be necessary to create the bitstreams to be spliced in a certain manner. There are two facets to the creation of bitstreams that can be spliced; the creation of the stream content, and the insertion of appropriate splice control information (i.e., in-point and out-point markers). For simplicity, assume that a desired value of the delay-parameter is known in advance. In addition, other goals, such as how often an in-point is wanted, are also known.

For the simplest case, encoding all I-frame low-delay format, the creation of the bitstream becomes a matter of rate-control. For each frame, there is a not-to-be-exceeded bit-count. The rate-control task is to encode each frame with the best quality possible within the bit-budget. The per-frame bit budget is computed as the transmission-bit-rate divided by the frame-rate.

For complex GOP encoding a forward analysis of the created stream may be made. The allocation of bits among frames must be done to assure that a decoder buffer doesn't underflow. A first constraint which may be applied to the created stream is the defining of a splice segment as a fixed GOP structure (e.g., 13 frames arranged in the following display order: ". . . IBBPBBPBBPBBP . . . "). This approach is straightforward a the expense of unnecessarily degraded picture quality. For example, a scene cut on the last P frame of an ". . . IBBPBBPBBPBBP . . . " GOP would be reproduced with a very small bit budget. Unfortunately, there is no single GOP structure that is ideal for all applications. Moreover, the loss of flexibility implied in this approach is probably unacceptable.

A second constraint which may be applied to complex GOP encoding is the insertion of in-points at out-points at predetermined time intervals (e.g., 2 and 0.5 seconds, respectively). This approach does not require the use of a specific GOP structure, therefore the encoder is free to select frame type based upon the input pictures.

There are various rate-control issues to be resolved when switching between MPEG streams or splice segments. As such, it may be necessary to constrain the contents or size of, e.g., coded picture bitstreams. One rate-control issue involves the amount of data transmitted to a decoder buffer. For example, the decoder buffer will not overflow if the buffer contents (measured in bits) at any out-point is less-than-or-equal-to the decoder buffer contents (measured in bits) measured at the most recent in-point. It is not necessary to know the actual number of bits, it is only necessary to ensure that the number of bits in the decoder buffer does not increase from in-point to out-point. It must be noted that so-called "stuffing bits" are not counted, since these bits are only included to meet specified transmission rates and disappear from the buffer when the real bits are used (i.e., stuffing bits do not accumulate in the buffer).

Another rate control issue involves the presentation time of decoded information frames in relation to the time the buffer receives the next frame. For example, the decoder buffer will not underflow if, at an out-point, the time (measured in time units) to display the not-yet displayed buffer contents is greater than the time (measured in time units) for the first I-frame to be delivered to the decoder at the specified bit rate. In other words, the next I-frame (the first frame of the to-stream) must be delivered to the decoder buffer before the buffer is emptied.

The above-described amount of time may be defined at the "Delay-Parameter" for the stream. The frame sizes (measured in time to transmit the frames at the operating bit rate) must be consistent with the operating delay parameters to ensure seamless splicing. The delay parameters are the end-to-end VBV size (measured in time) and the VBV contents (measured in time) at the beginning/end of a stream. An additional, globally defined value is the maximum size of physical buffers (in bits). This maximum size must be greater than the maximum VBV size implied by the MPEG profile and level indication criteria. Finally, the decode time stamp at an out-point of a from-stream should be one frame time of the stream greater that the DTS and PTS of the last frame of the from-stream.

As previously mentioned, it is important to distinguish between a splicing decision and the actual process of splicing. A splicing decision is made by some human. The decision may be made in the process of generating a list of programming to be transmitted by a television studio or in real time as the studio is transmitting. The splicing decision may be made by some surrogate process, such as a preprogrammed command to splice a station identification announcement into the studio transmission every day at 12:05 AM. The decision may be to splice at a particular time in the future or immediately.

Several parameters of the streams to be spliced may be known at the time of the decision, though these parameters may change prior to the actual splicing operation. For example, the splicing decision is usually made with some knowledge of the to-stream, such as the stream length, VBV delay parameter and the like. It is possible for the from-stream to be unknown at the time of the decision (e.g., the daily message is inserted into whichever stream is being transmitted at the time of insertion).

A decision contains the following elements. First, the operational unit which sources the to-stream, the operational unit which performs the splice and the stream or segments to be spliced. Second, the time the splice is to take place. The time may be "now," a particular time of day or the occurrence of some logical condition. "Now" means make the next splice after the arrival of the splice-now message. The now decision may arise from direct human action (e.g., button-press) or some external controlling process deciding to send a splice-now message. The logical condition may be the occurrence of a time-code (e.g., SMPTE) in a particular information stream, a time stamp (e.g., PTS or DTS) in a video or audio stream, a reference time (e.g., PCR) in an information stream or some other detectable event (e.g., an input stream PID changes). The logical events may be combined in a logical manner to determine a splice time and select appropriate streams for splicing.

After a decision is made it is communicated to the appropriate operational unit. Since there is a possibility of errors (e.g., due to the complexity of combining multiple logical events) it is important for the controlling entity to monitor the splicing process closely and adapt to error conditions and other conditions.

As a result of the decision, and part of making the splice work, is the process of assuring that the correct bitstream is applied to the correct input of the operational unit at the correct time. This is a function of overall system operation, and may involve synchronization of information flow from a server to the switcher. After receiving the splicing decision the splicer will make the splice. The process of seamless splicing requires that the to-stream is entered at an in-point, the from-stream is exited at an out-point and, possibly, the management of one or more buffer and timing parameters.

Illustrative Examples of Video Splicing

The above-described concepts will now be illustrated using several examples of MPEG bitstream splicing operations. The first example is an all I-frame low delay splicing example. A to-stream comprises either 24 or 30 frames per second (fps) video streams including only I-frames. The delay parameter of the to-stream is equal to one frame time at the slowest frame rate (i.e., 42 mS if 24 fps). In this example each of the I-frames contains fewer bits than can be sent in one unit of display time (i.e., one 42 mS frame time) at the bit rate for the frame. If the bit rate is 150 Mb/s, a 30 fps frame contains no more than 5 Mb. If the bit rate is 150 Mb/s, a 24 fps frame contains no more than 6.25 Mb.

When the last bit of a from-stream having the same parameters has entered a decoder buffer, the presentation time stamp indicating when the last frame is to be presented has a value 42 mS in the future. Thus, if the from-stream were at 30 Hz. (33 mS frame rate), 9 ms. after the out-point the last frame of the from stream will be taken from the decoder buffer, and 33 mS later the first frame of the to-stream will be needed. If the to-stream is also 30 Hz, the first frame will have been delivered 9 mS before it is needed. If the from-stream were at 24 Hz, and the to-stream were also at 24 Hz, the to-stream frame arrives just in time. If the from-stream were at 60 Hz, (17 mS) then when the last bit of the from-stream is delivered, the decoder buffer contains 2 frames (33 mS) and the decoder will not use the first of them for 9 mS. If the bit-rates of the from and to sequences differ, as long as the bits are delivered at the rate corresponding to the sequence bit-rate, the time to load frames remains correct. To summarize, streams are coded with a bit-count between the in-point and following out-points that is calculated from the bit-rate and the frame-time (i.e., bit-rate * frame-time). The presentation time-stamps are set to values that all agree with the delay-parameter (i.e., first frame presented delay-parameter after the first bit arrives.).

The second example is a complex GOP transmission format. For purposes of the second example, it is assumed that stream is a 30 frame per second video (and associated audio) stream having delay-parameter of 250 mS, a display order of ". . . IBBPBBPBBPBBPBBP . . . " and transmission order of ". . . IPBBPBBPBBPBBPBB . . . " (where "I" represents an I-frame, "P" represents a P-frame and "B" represents a B-frame). This GOP structure includes in-points on the I-frames and out-points on the frame immediately preceding the I-frames. At each out-point, the PTS associated with the last P frame is 250 mS in the future. The rate control ensures that the decoder buffer doesn't underflow on the I-frame. It must contain less than 250 mS worth of bits. The valid-MPEG constraint implies that the P-frame following the I frame also doesn't underflow. It is not necessary that the I-frame use all 250 mS. If the I-frame does use all 250 ms, the next P-frame must use less than 33 mS (i.e., if the I-frame used 230 ms, the next P-frame would be permitted, though not required, to use 53 mS).

The third example is a multiple output example. For purposes of the third example it is assumed that stream is a 30 frame per second video (and associated audio) stream having the following GOP structure: ". . . IPPPPPPPPPP-PPPPPPPPPPPPPPPPPPPPPPPPPPPPIPPPP . . ." The stream is also assumed to have a delay-parameter of 250 mS and a transmission bitrate of 20 Mb/s (i.e., 670 Kb per frame). If an I-frame takes 231 mS and P-frame takes 20 mS then, after 15 frames, the decoder buffer contents have subsided to a level below the level at the in-point to the stream. This may be calculated using an equation such as the following:

$$(231+20N)=33*(N+1)$$

The above equation represents the time for bits entering, starting with an I-frame's 231 mS worth of data, followed by N 20 mS P-frames, being equated to the time for the same N+1 frames-worth of bits to be taken from the buffer (N+1) frames, each taking 33 mS. In this example each I-frame may be an in-point and all the P-frames after the fifteenth P-frame may be out-points.

The decoder buffer reacts as follows. At the splice point, the buffer contains 7 frames and a presentation time stamp indicates that the last frame is to be presented in 250 mS. The 7 frames each use 20/33 of the bits/frame quota (i.e., each P-frame frame is 400 Kb and the buffer contains 2.8 Mb). Over the next 7 frames, the I-frame comes in, increasing the buffer contents. Since each I-frame adds 670 Kb and each P-frame taken out removes 400 Kb the buffer contains 4.7 Mb after the seven P-frames are taken out. The I-frame is then presented, removing 4.6 Mb from the buffer and, therefore, leaving 100 Kb in the buffer. The delay in the buffer is approximately zero. Each P-frame now adds 400 Kb in 20 mS and every 33 ms 400 Kb is used. Thus, delay in buffer increases by 13 mS every frame time. After 15 frames, the delay stored in the buffer has reached the delay-parameter value. At this time a splice to another sequence may be made because the buffer is able to receive an I-frame.

Compressed Audio Splicing

The following discussion of splicing of compressed audio is limited to the issue of splicing combined video-audio streams in the audio-follows-video mode. The composition of streams from separately edited audio and video streams is not considered here.

Compressed audio is carried in frames. Each audio frame is of fixed duration and contains a fixed number of bits. Unfortunately, the audio frame size, or duration, is different from any of the video frame sizes, or durations. This means that audio frames will not align with splice points. Audio frames can be considered to be randomly aligned with the video. Therefore, when making a splice, the alignment of the audio with the video will be different for the to-stream and the from-stream.

It is desirable to ensure alignment of audio information to corresponding video information (i.e., "lip-sync"). That is, the audio and video must remain properly phased with respect to each other. A Presentation Time Stamp (PTS) exists in each audio stream. The audio and video PTSs refer to the same reference to allow the required synchronization. When the splice is complete, the to-stream becomes the output stream. It is important to note that, particularly due to audio constraints, the process of switching may extend in time before and after the actual switch instant.

Audio information frames in an information stream are ideally located within a limited time difference from respective video information arrival at the end of the decoder buffer. If there is a ½ second end-to-end video buffer delay, then audio packets should be approximately ½ second later in a transmission stream than corresponding (i.e., having the same presentation time stamps) video packets. If this assumption is correct, then the switching operational unit must save audio information from the from stream for this ½ second after the video switch. The source stream must continue for ½ second after the splicer has switched to another stream. It is also amusing to contemplate rapid switching among several streams.

Three approaches to splicing audio will now be described. First, the overlapped audio packets may simply be broken. This is not the most desirable approach because it relies upon the CRC to prevent the use of partial packets. If the CRC fails one time in 64 K packets, at about 30 packets/second, every few thousand seconds there is a potential undetected error. When a broken-packet CRC fails, it fails every time the packet is used. This means that a failure that produces a click may end up reproduced every time the same splice is made. This requires the use of a garbage-collecting process to remove broken audio frames.

A second approach to splicing audio is to include "unfinished" from-stream audio frames (i.e., those overlapping a video splice) in the resultant stream. The to-stream audio frames are then retimed such that they butt up against the "unfinished" from-stream audio frame. This technique assures continuous audio at the expense of continuous inspection, buffering and adjustment of audio frames and packets. The first complete to-stream audio frame is selected as the first audio frame to play because the to-stream frame which has already started is likely to be delayed too much to match the end of the "unfinished" from-frame. This technique also causes a slightly distorted lip-sync.

A third approach to splicing audio is to maintain alignment of audio with its corresponding video, that is, to leave a gap between the end of the from-stream audio frame and the beginning of the to-stream audio frame. This approach advantageously relies on the MPEG decoder specification which requires that audio frame gaps are muted. In this approach the audio presentation-time-stamps are adjusted by the same adjustment amount applied to the video frames. In this manner lip sync is maintained. The third approach is especially useful when many splices (e.g., the creation of a sequence from a succession of short splice segments) may produce audio artifacts due to the muting.

FIG. 5 depicts a plurality of splicing scenarios involving audio alignment which illustrate aspects of audio-video splicing, assuming the above cited third approach is used to maintain alignment of audio with its corresponding video.

Figure 5A:
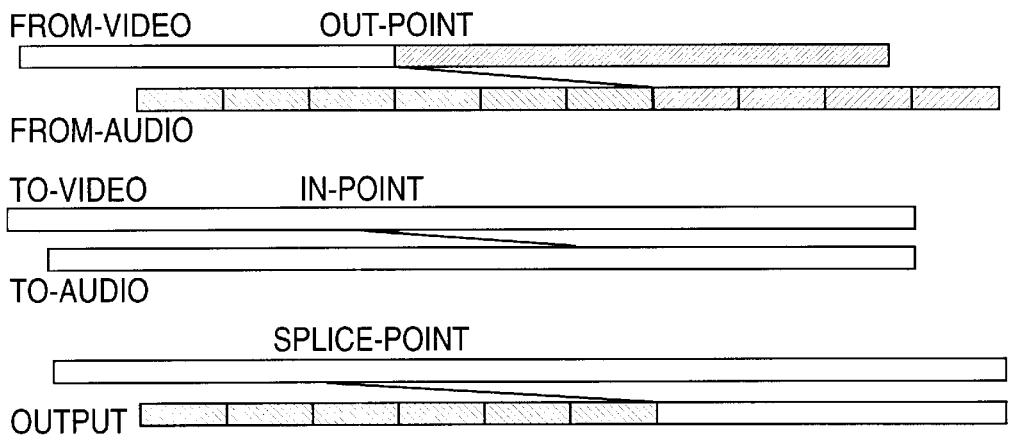
FIGS. 5A–5C depicts a plurality of splicing scenarios.

FIG. 5A depicts the simple splicing case where both audio streams align with their corresponding video. The splicer delays both to-streams and simply switches at the splice point.

Figure 5B:
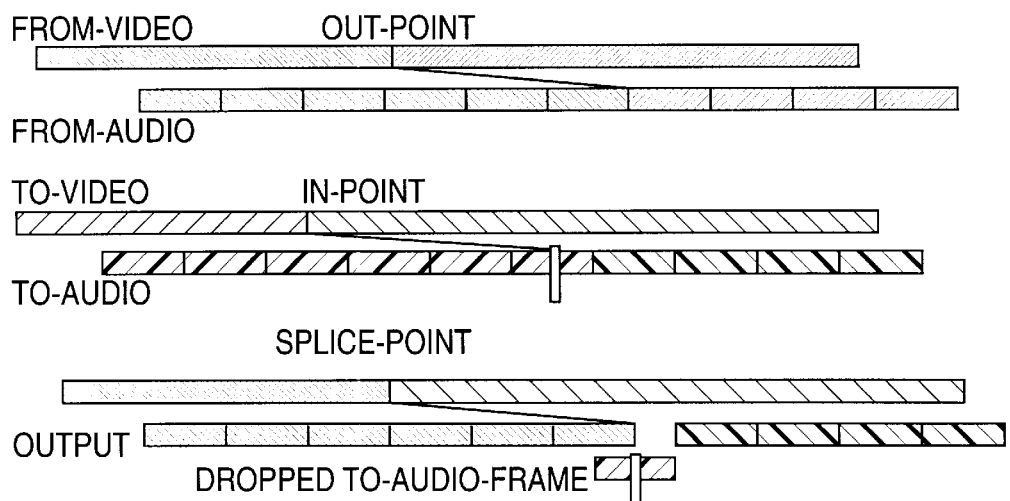

FIG. 5B depicts the splicing case where the from-stream video and from-stream audio are aligned, but the to-stream video and to-stream audio are not aligned. When the splice is made, a partial to-stream audio frame is discarded. The next complete to-audio frame is passed to the output with appropriate delay.

Figure 5C:
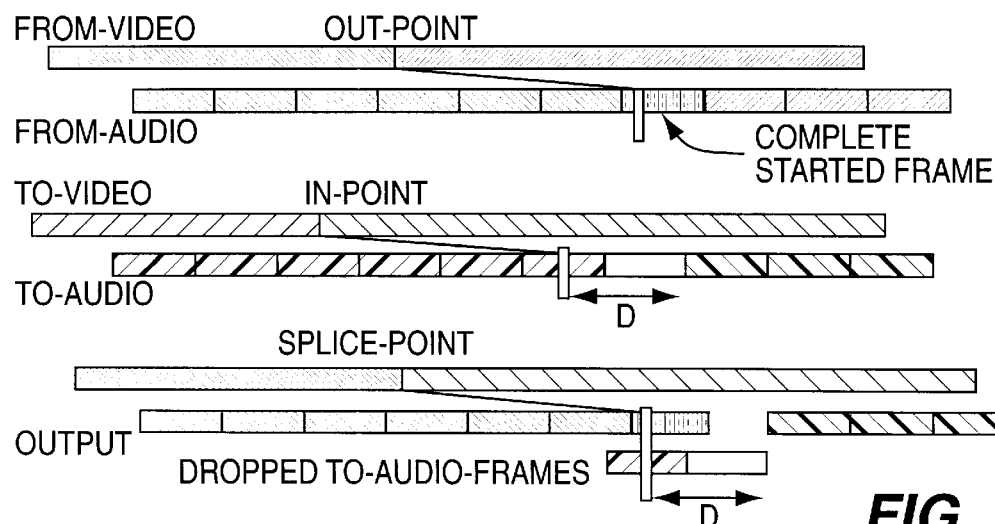

FIG. 5C depicts the typical splicing case where both audio streams do not align with the corresponding video streams. It can be seen that a from-stream audio frame has already begun before the splice point. This audio-frame is buffered and transferred to the output. It doesn't end until some fraction of a frame time after the splice. The to-stream audio frame that spans the splice-point cannot be used. The next to-stream audio frame also cannot be used. It begins too early, and would overlap the last from-stream audio frame. The first to-stream audio frame that appears in the output stream begins D time units after the splice-point. This delay may be as much as two audio frames.

In the above example (FIG. 5C) the lip-sync is preserved, but as much as 32 mS of from-stream audio overlaps the to-stream video. Also, the first to-stream audio begins as late as 64 mS after to-stream video begins. Finally, the splicer performing the splicing operation must buffer a whole audio frame in each work buffer.

Ideally, every audio frame includes a PTS. It is possible that some equipment manufacturers only include a PTS every, e.g., third audio frame. In this case, or the case where there is no audio PTS, a splicing operation may be performed after calculating a virtual time-stamp. The virtual time stamp is derived from the approximate real-time delay of audio-frames from video reference time-stamps. The virtual audio-time-stamp is then incremented by the (known) audio-frame duration on successive audio-frame starts. This process may be implemented as a backup process to ensure that non-time stamped audio streams to not get into a studio where time stamps are crucial to the operation of the studio.

Auxiliary Data Splicing

Auxiliary data is included in many MPEG streams. This data is usually present as contiguous, unbreakable streams of unknown length. By contrast, a compressed audio stream is relatively well-behaved and predictable. The auxiliary data stream may be associated with a corresponding video stream having a delay that is not now specified.

There are several methods for handling auxiliary data in a splicing operation, including: 1) ignore it and splice the auxiliary data at the same time as the video data; 2) insert auxiliary data through a separate path to, e.g., a play-to-air switcher (this data may comprise a program guide or other consumer-related information); and 3) define a set of segmentation markers for auxiliary data and rely upon these markers in switchers to keep segmentation correct (this requires knowledge about the content of auxiliary data streams and the lengths of auxiliary data segments within those streams). The auxiliary data may also be switched with or without a delay, and the delay may be a parameter passed to the switcher by a decision making controller. The auxiliary data may be input to the splicer via an auxiliary input. Input arriving on the auxiliary-data input may be buffered and inserted into the output stream on a space-available basis as a replacement for null packets. In this case it becomes some other system unit's responsibility to align such data within streams, and to provide channel capacity for inserted aux-data by, e.g., reducing a video stream data rate.

Although various embodiments which incorporate the teachings of the present invention have been shown and described in detail herein, those skilled in the art can readily devise many other varied embodiments that still incorporate these teachings.

What is claimed is:

1. A method for splicing bitstreams, said bitstreams comprising a plurality of information segments representative of a sequence of information frames, said method comprising the steps of:

monitoring a first bitstream to detect an exit indicium, said first bitstream being coupled to an output and including at least one of said exit indicium, said exit indicium indicative of an appropriate last information segment of a splicing segment;

providing a second bitstream, said second bitstream including at least one entrance indicium, said entrance indicium indicative of an appropriate first information segment of a splicing segment; and coupling said second bitstream to said output in response to a splice decision signal, a detection of said exit indicium in said first bitstream and a detection of said entrance indicium in said second bitstream, said step of coupling comprising the steps of:

decoupling said first bitstream from said output at a detected exit indicium;

coupling said second bitstream to said output at a detected entrance indicium; and transmitting a splice acknowledgment signal.

2. The method of claim 1, wherein:

said splice decision signal comprises at least one of a desired temporal parameter, a desired splice quality parameter and a priority parameter; and said splice acknowledgment signal comprises at least one of an actual temporal parameter and an actual splice quality parameter.

3. The method of claim 2, wherein:

said desired temporal parameter is indicative of a desired time to perform said coupling step;

said desired splice quality parameter is indicative of a minimum splice quality level, said minimum splice quality level being less than or equal to a seamless splice quality level;

said actual temporal parameter is indicative of a time said coupling step was performed; and said actual splice quality parameter is indicative of a quality level of a bitstream produced during said coupling step.

4. A method for splicing bitstreams, said bitstreams comprising a plurality of information segments representative of a sequence of information frames, said method comprising the steps of:

monitoring a first bitstream to detect an exit indicium, said first bitstream being coupled to an output and including at least one of said exit indicium, said exit indicium indicative of an appropriate last information segment of a splicing segment;

providing a second bitstream, said second bitstream including at least one entrance indicium, said entrance indicium indicative of an appropriate first information segment of a splicing segment; and coupling said second bitstream to said output in response to a control signal, a detection of said exit indicium in said first bitstream, a detection of said entrance indicium in said second bitstream, said step of coupling comprises the steps of:

comparing a delay parameter associated with said first bitstream to a delay parameter associated with said second bitstream; and coupling said second bitstream to said output in response to said delay parameters being substantially equal.

5. The method of claim 4 wherein said control signal comprises a splice decision signal, and said step of coupling further comprises the steps of:
- decoupling said first bitstream from said output at a detected exit indicium;
- coupling said second bitstream to said output at a detected entrance indicium; and
- transmitting a splice acknowledgment signal.

6. The method of claim 5 further comprising the step of:
- storing, in response to a detected entrance indicium in said second bitstream, said appropriate first information segment and a plurality of successive information segments associated with said detected entrance indicium; and wherein:
- said splice decision signal includes at least a priority parameter, and said step of coupling further comprises the steps of:
- increasing or decreasing a delay parameter associated with said stored information stream in response to a predetermined priority parameter.

7. A method for splicing a first information stream into a second information stream to produce an output information stream, each of said information streams comprising a plurality of information segments representative of a sequence of information frames, said method comprising the steps of:
- coupling said second information stream to an output to produce said output information stream;
- detecting an intra-coded information frame in said first information stream, said first information stream including at least one of said intra-coded information frame, said intra-coded information frame indicative of an appropriate first information segment of a splicing segment;
- storing, in response to said intra-coded information frame, said first information segment in a first portion of a memory, said information segments representative of a sequence of information frames succeeding said intra-coded information frame being stored in a second portion of memory, and a plurality of successive information segments, said step of storing comprises the steps of:
  - storing information segments representative of said intra-coded information frame in a first portion of a memory;
  - storing information segments representative of a sequence of information frames succeeding said intra-coded information frame in a second portion of memory;
  - repeating said step of storing each time an intra-coded information frame is detected in said first information stream;
- detecting an exit indicium in said second information stream, said second information stream including at least one of said exit indicium, said exit indicium indicative of an appropriate last information segment of a splicing segment;
- retrieving, in response to said exit indicium, said stored information segments; and
- coupling said retrieved information segments to said output to produce said output information stream.

8. Apparatus for splicing information streams, said apparatus comprising:
- a buffer receiving a first information stream and producing a buffered information stream;
- a bitstream examiner, coupled to said buffer, receiving said first information stream and responsively causing said buffer to position an entrance point of said buffered information stream at an output of said buffer;
- a switch, for coupling either said buffered information stream or a second information stream to an output; and
- a switch controller, for transmitting a splice acknowledgement signal, coupled to said switch and receiving said second information stream and a splice decision signal, for monitoring said second information stream and, in response to said splice decision signal and the detection of an exit point in said second information stream, causing said switch to couple said buffered information stream to an output.

9. The apparatus of claim 8, wherein:
- said switch controller compares a delay parameter associated with said buffered information stream to a delay parameter associated said second information stream; and
- said switch controller, in response to said delay parameters being substantially equal, causes said switch to couple said buffered information stream to said output.

10. The apparatus of claim 9, wherein said switch control signal comprises a splice decision signal including at least a priority parameter, and said switch controller transmits a splice acknowledgment signal.

11. The apparatus of claim 9, wherein said switch controller is coupled to said bitstream examiner, and wherein:
- said switch controller, in response to a predetermined priority parameter of said switch control signal, causes information to be added or deleted from said buffer such that said delay parameter of said buffered information stream is, respectively, increased or decreased.

12. Apparatus for splicing information streams, said apparatus comprising:
- a buffer receiving a first information stream and producing a buffered information stream;
- a bitstream examiner, coupled to said buffer, receiving said first information stream and responsively causing said buffer to position an entrance point of said buffered information stream at an output of said buffer, said buffer being flushed by said bitstream examiner each time an entrance point is detected in said first information stream;
- a switch, for coupling either said buffered information stream or a second information stream to an output; and
- a switch controller, for transmitting a splice acknowledgement signal, said splice acknowledgement signal comprising at least one of an actual temporal parameter and an actual splice quality parameter, coupled to said switch and receiving said second information stream and a splice decision signal, for monitoring said second information stream and comprising at least one of a desired temporal parameter, a desired splice quality parameter and a priority parameter, and the detection of an exit point in said second information stream, causing said switch to couple said buffered information stream to an output.

13. The apparatus of claim 12, wherein:
- said desired temporal parameter is indicative of a desired time to couple said buffered information stream to said output;
- said desired splice quality parameter is indicative of a minimum splice quality level, said minimum splice quality level being less than or equal to a seamless splice quality level;
- said actual temporal parameter indicative of a time said buffered information stream was coupled to said output; and
- said actual splice quality parameter is indicative of a quality level said output information stream.

* * * * *